(12) United States Patent
Nakamura et al.

(10) Patent No.: US 6,281,664 B1
(45) Date of Patent: Aug. 28, 2001

(54) GENERATOR AND GENERATOR APPARATUS

(75) Inventors: Masashi Nakamura; Motohiro Shimizu, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/481,067

(22) Filed: Jan. 11, 2000

(30) Foreign Application Priority Data

| Jan. 13, 1999 | (JP) | 11-005929 |
| Jan. 22, 1999 | (JP) | 11-013951 |
| Jan. 22, 1999 | (JP) | 11-013952 |

(51) Int. Cl.[7] .................................. H02P 9/04
(52) U.S. Cl. ........................ 322/22; 322/20; 322/25
(58) Field of Search ........................ 322/12, 14, 17, 322/20, 21, 22, 23, 24, 25, 29, 46

(56) References Cited

U.S. PATENT DOCUMENTS

| 4,217,538 | * | 8/1980 | Ziemacki | 322/29 |
| 4,392,099 | * | 7/1983 | Kuniyoshi | 318/797 |
| 4,456,870 | * | 6/1984 | Rodari | 322/29 |
| 4,539,515 | * | 9/1985 | Morishita et al. | 320/17 |
| 4,788,486 | * | 11/1988 | Mashino et al. | 320/17 |
| 4,829,228 | * | 5/1989 | Buetemeister | 322/27 |
| 5,245,267 | * | 9/1993 | Pierret et al. | 320/15 |
| 5,444,355 | * | 8/1995 | Kaneyuki et al. | 322/58 |
| 5,739,676 | * | 4/1998 | Judge et al. | 322/22 |
| 6,118,186 | * | 9/2000 | Scott et al. | 290/40 B |

FOREIGN PATENT DOCUMENTS

| 5-244726 | 9/1993 | (JP) . |
| 8-205543 | 8/1996 | (JP) . |
| 11-308896 | 11/1999 | (JP) . |

OTHER PUBLICATIONS

English translation of the portion of the Japanese Publication No. 11–308896.

* cited by examiner

*Primary Examiner*—Nicholas Ponomarenko
(74) *Attorney, Agent, or Firm*—Armstrong, Westerman, Hattori, McLeland & Naughton, LLP

(57) ABSTRACT

Two generation systems 3, 8 each including inverter 8 are switched over between series connection and parallel connection by switching section 5. Reference waveform signals are mutually communicated between the two generation systems through communication lines 6. When a phase difference between these two reference waveform signals is within a predetermined range, the inverters are driven to generate an output alternating current. One of the conduction angles of thyristors 3a, 3a in two converters 3, 3 which is larger than the other is inputted to a deviation detector 42. Based on a deviation of the conduction angle inputted from a target conduction angle, an updated target rotational speed is set in a calculator 44. A throttle controller 48 controls a throttle opening angle so that an actual rotational speed converges into the target rotational speed. A ground fault is judged based on a potential difference across one node point in a first arm, connected to the earth and the other node point in a second arm of a resistance bridge provided across a pair of output terminals of either one of the inverters.

8 Claims, 12 Drawing Sheets

GENERATOR AND GENERATOR APPARATUS

BACKGROUND OF THE INVENTION

1. Field of the Invention

The present invention relates to a generator equipped with a dual voltage inverter having two inverter system, and a generator apparatus having these generators connected in parallel.

2. Description of Related Art

There has been known a generator equipped with an inverter for converting a direct current (DC) into an alternating current (AC) of a desired frequency. Further, there has also been known a generator having two inverters connected in parallel. For example, in Japanese Patent Application Laid-Open No. 8-205543, there is a description of an apparatus for an inverter operation capable of stable parallel operation of two inverters.

It has been desired to obtain two-level output voltages in the above-described generator having one or more inverters. In a generator having an inverter (s), it is possible to obtain two kinds (two levels) of AC output voltages, such as, for example, 120 V and 240 V, by switching an output of a rectification device, that is, a DC voltage input to the inverter, at two levels.

However, in the case of switching over a DC voltage between two levels as described above, it is necessary to make the dielectric strength of the inverter correspond to a higher-voltage side and to make the output current capacity correspond to a higher-current side, respectively. Therefore, it is necessary to increase the size of an inverter circuit and to increase the size of what is called a power element such as an electrolytic capacitor, a choke coil or the like.

There has also been a desire to obtain many kinds of output power, other than changing over an output voltage at two levels or changing over an output power into two levels. However, at present, it is not possible to meet these requirements in an efficient manner by using a compact apparatus.

It is considered possible to obtain two-level AC output voltages by operating two inverters in series or in parallel. FIG. 13 is a connection diagram of a generator having two inverters connected in series. As shown in FIG. 13, it is possible to obtain two-level output voltages of 120 V and 240 V by serially connecting two inverters A and B capable of outputting an AC voltage of 120 V based on a power generated by a generator G. According to the kind of serial operation, however, the balance between the outputs of the two inverters A and B may be broken in some cases depending on the load taken by the inverters.

Further, there is a case where a control method is employed for adjusting a rotational speed of an engine to an optimum value according to the magnitude of a load when a generator is driven by an engine (hereinafter, "eco-throttle control" method). When an electronic governor is set in only one inverter to carry out the eco-throttle control by the CPU of said one inverter and when a heavy load is connected to the other inverter not provided with the electronic governor, for example, there is a problem that it is not possible to secure a sufficient level of an output voltage because the two inverters are out of balance.

In the case of connecting two inverter systems as described above, it is necessary to provide a ground fault interrupter for each series. FIG. 14 is a circuit diagram showing a structure of a generator equipped with a conventional ground fault interrupter. Referring to the drawing, a ground fault interrupter 110 is provided at the output side of a generator 100, and a plug socket 120 for taking out power is connected through the ground fault interrupter 110. The ground fault interrupter 110 is comprised of a detecting section 121 and an operating section 122. The detecting section 121 comprises of a current transformer (ZCT) 121a and an oscillation coil 121b provided on an output line of the generator 100, and a controller 121c for energizing a relay coil 122a of the operating section 122 based on detected signals. A contact point 122b of the operating section 122 is "normally closed", and it is "opened" when the relay coil 122a is energized by the controller 121c.

As the ground fault interrupter 110 is manufactured and marketed as a single integrated unit, it is usually large in size and expensive. When the interrupter is externally installed on the generator, it leads to an increase in the overall size of the generator.

SUMMARY OF THE INVENTION

It is a first object of the present invention to provide a generator capable of efficiently obtaining output voltages and power at a plurality of levels, and a generator apparatus using such generator.

It is a second object of the invention to provide a generator capable of obtaining an output voltage at two levels in good balance when two inverters are connected with each other.

It is a third object of the invention to provide a generator having a compact and low-cost ground fault interrupter capable of detecting a ground occurring in any one of two inverter systems.

A generator having a first feature of the present invention includes two power source systems each of which comprises a rectifier circuit for rectifying an input alternating current into a direct current and an inverter circuit for converting the direct current inputted from the rectifier circuit into an alternating current of a predetermined frequency, one of said systems further comprising target waveform generating means for producing a reference waveform to determine an output frequency of the inverter circuit means for producing a reference waveform clock signal representative of the reference a waveform to the other system means for receiving a second reference waveform clock signal transmitted from the other system phase difference detecting means for detecting a phase difference between the first and second reference waveform clock signals; and frequency adjusting means for adjusting the output frequency so that the phase difference detected by the phase difference detecting means is within a predetermined range wherein the generator includes switching means for selectively connects the two power source systems in series connection or in parallel connection.

According to a first aspect of the present invention, it is possible to connect in series or in parallel the outputs of two inverter circuits. Further, it is possible to synchronize the outputs of the two inverter circuits connected with each other by mutually communicating reference wave clock signals.

A generator apparatus having a second feature of the present invention includes two generators recited in claim 1 connected in parallel, wherein one of said two systems incorporated in each of the generators comprises current detecting means for detecting an output current of the intra-systems voltage detecting means for detecting an output voltage of the intra-systems second phase difference detecting means for detecting a second phase difference between the output current and the output voltage and second frequency adjusting means for adjusting the output frequency so that the second phase difference is within a second predetermined range, and wherein when a phase difference between the reference waveform clock signals is within a predetermined range, the generator starts a power generation by energizing the inverter circuit, and the function of the frequency adjusting means recited in claim 1 is stopped in response to the starting of the power generation.

According to a second aspect of the invention, there are a plurality of parallel-connected generators each having two series of inverter circuits capable of switching over between series connection and parallel connection. Therefore, it is possible to obtain many kinds of outputs (power). When the parallel-connected generators are not synchronized, phase differences of output currents and output voltages of the two series of inverter circuits included in the generators are not kept within a predetermined range. To avoid this problem, according to the second aspect of the invention, the parallel-connected generators are made synchronized by adjusting frequencies or phases of the output currents and voltages. Further, it is also possible to carry out a synchronous operation of the two generators by controlling such that a reference frequency clock signals of one and the other system are synchronized with each other by communications between them before a power generation is started, and that phase differences of output currents and output voltages are kept within a predetermined range once after the power generation has been started.

A generator apparatus having a third feature of the present invention includes means for transmitting the second phase difference to the other system in the same generator means for receiving a second phase difference transmitted from the other system and correcting means for correcting an adjustment quantity issued by the second frequency adjusting means, based on a phase difference between the first and the second phases.

According to a third aspect of the invention, it is possible to correct an adjustment quantity of second frequency adjusting means according to a phase difference between the two generators without fixing the adjustment quantity.

A generator having a fourth feature of the present invention includes a converter circuit structured with semiconductor rectification elements for converting the alternating current into a direct current by controlling a conduction of the semiconductor rectification elements and an inverter circuit for converting the direct current into an output alternating current of a predetermined frequency rectification element driving means for controlling a conduction angle of the semiconductor rectification elements so that an output voltage of each converter circuit is equal to a predetermined target voltage value and engine control means for detecting a conduction angle of the rectification elements in a converter circuit at a master side of the two systems of inverter apparatuses and for controlling a rotational speed of the engine so that the detected conduction angle converges into a predetermined target angle.

According to a fourth aspect of the invention, the engine speed is controlled so that a conduction angle of the converter is converged into a target value when the two inverter systems are used. Therefore, it is possible to operate the generators with room or margin of 20% by setting the target value at 80% of the full conduction angle, for example.

A generator having a fifth of the present invention includes two systems of inverter apparatuses each of which consisting of a converter circuit structured with semiconductor rectification elements for converting the alternating current into a direct current by controlling a conduction of the semiconductor rectification elements and an inverter circuit for converting the direct current into an output alternating current of a predetermined frequency rectification element driving means for controlling a conduction angle of the semiconductor rectification elements so that an output voltage of each converter circuit is equal to a predetermined target voltage value conduction angle judgement means for making a decision as to which one of conduction angles of two converter circuits of the two inverter apparatuses is larger and engine control means for controlling a rotational speed of the engine so that the larger conduction angle converges into a predetermined target angle value.

According to a fifth aspect of the invention, the engine speed is controlled based on an inverter with a larger conduction angle of the rectifier, that is, with a heavier load, of the two inverter systems. Therefore, it will never occur such a situation that it is not possible to secure a sufficient level of an output voltage because of an out of balance of the two inverter systems, even if a heavy load is applied to the inverter where the engine control means is not provided.

A sixth aspect of the present invention is characterized in that the conduction angle discrimination means and engine control means are provided as control means of only a master inverter and that there is provided a communication port for transmitting a conduction angle of a slave inverter to the conduction angle discrimination means.

According to the sixth aspect of the invention, a conduction angle of a rectification element in the slave inverter is communicated to the master through the communication port, and a process such as a decision of the conduction angle is made at the master side.

A generator having a seventh feature of the present invention includes a converter circuit for converting an alternating current into a direct current by controlling a current conduction of semiconductor rectification elements and an inverter circuit for converting the direct current into an output alternating current of a predetermined frequency, said generator comprising a resistance bridge provided across output terminals of the inverter apparatus and having one node point of the bridge connected to the earth voltage difference detecting means for detecting a voltage difference across said one node and the other node points of the resistance bridge and discrimination means for outputting a ground fault signal when the voltage difference is equal to or above a threshold value for discrimination of a ground.

According to a seventh aspect of the invention, a voltage difference is generated between two resistance divided voltages when a ground fault has occurred. When the voltage difference is over a predetermined reference value, a ground detection signal is output.

Further, a generator having a eights features of the present invention includes an inverter apparatus consisting of a converter circuit for converting an alternating current into a direct current by controlling a current conduction of semiconductor rectification elements and an inverter circuit for converting the direct current into an output alternating current of a predetermined frequency, said generator comprising series/parallel switching means for selectively connecting the two inverter systems in series or in parallel connection a resistance bridge provided across output terminals of one of the two systems of the inverter apparatuses having one node point of the bridge connected to the earth voltage difference detecting means for detecting a voltage difference across said one node and the other node points of the resistance bridge and discrimination means for outputting a ground fault signal when the voltage difference is equal to or above a threshold value for discrimination of a ground.

According to an eighth aspect of the invention, when two system of inverters are provided, any ground at an output stage of any system can be detected by detecting a resistance divided voltage with respect to any one of output terminals.

DETAILED DESCRIPTION OF THE PREFERRED EMBODIMENTS

Figure 1:
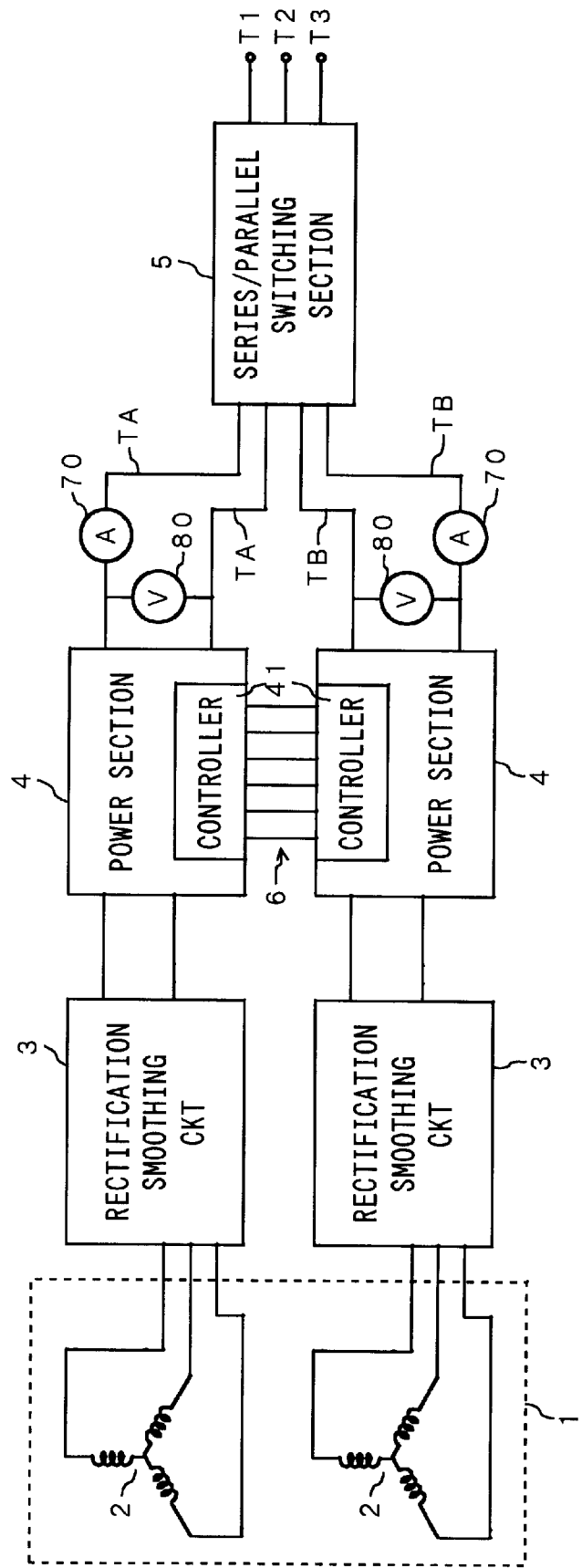
FIG. 1 is a block diagram showing a generator according to a first embodiment of the present invention.

The present invention will be explained in detail below with reference to the drawings. FIG. 1 is a block diagram showing a sine-wave inverter generator (hereinafter, "a generator") according to a first embodiment of the present invention. The generator has two inverter systems. A generator main body 1 has a set of three-phase output windings 2 and 2 wound around a stator (not shown). A rotor (not shown) consisting of multipolar permanent magnets is provided corresponding to these three-phase output windings 2 and 2. The rotor is rotated by a driving source such as an engine or the like.

The output sides of the three-phase output windings 2 and 2 are connected to the input sides of rectification smoothing circuits 3 and 3 as DC source respectively, and the output sides of the rectification smoothing circuits 3 and 3 are connected to the input sides of power sections 4 and 4 including inverter circuits respectively. Output lines TA, TA and TB, TB of the power sections 4 and 4 are connected to external output terminals T1, T2 and T3 through a series/parallel switching section 5. The output lines TA, TA and TB and TB are provided with current detecting circuits 70 and 70 and voltage detecting circuits 80 and 80 respectively for detecting output currents and output voltages of the power sections 4 and 4. Controllers 41 and 41 of the power sections 4 and 4 are realized with microcomputer (s), and these controllers are connected together with communication lines 6. Control signals and synchronizing signals are transmitted and received through these communication lines 6 for synchronizing both power sections 4 and 4 with each other.

Figure 2:
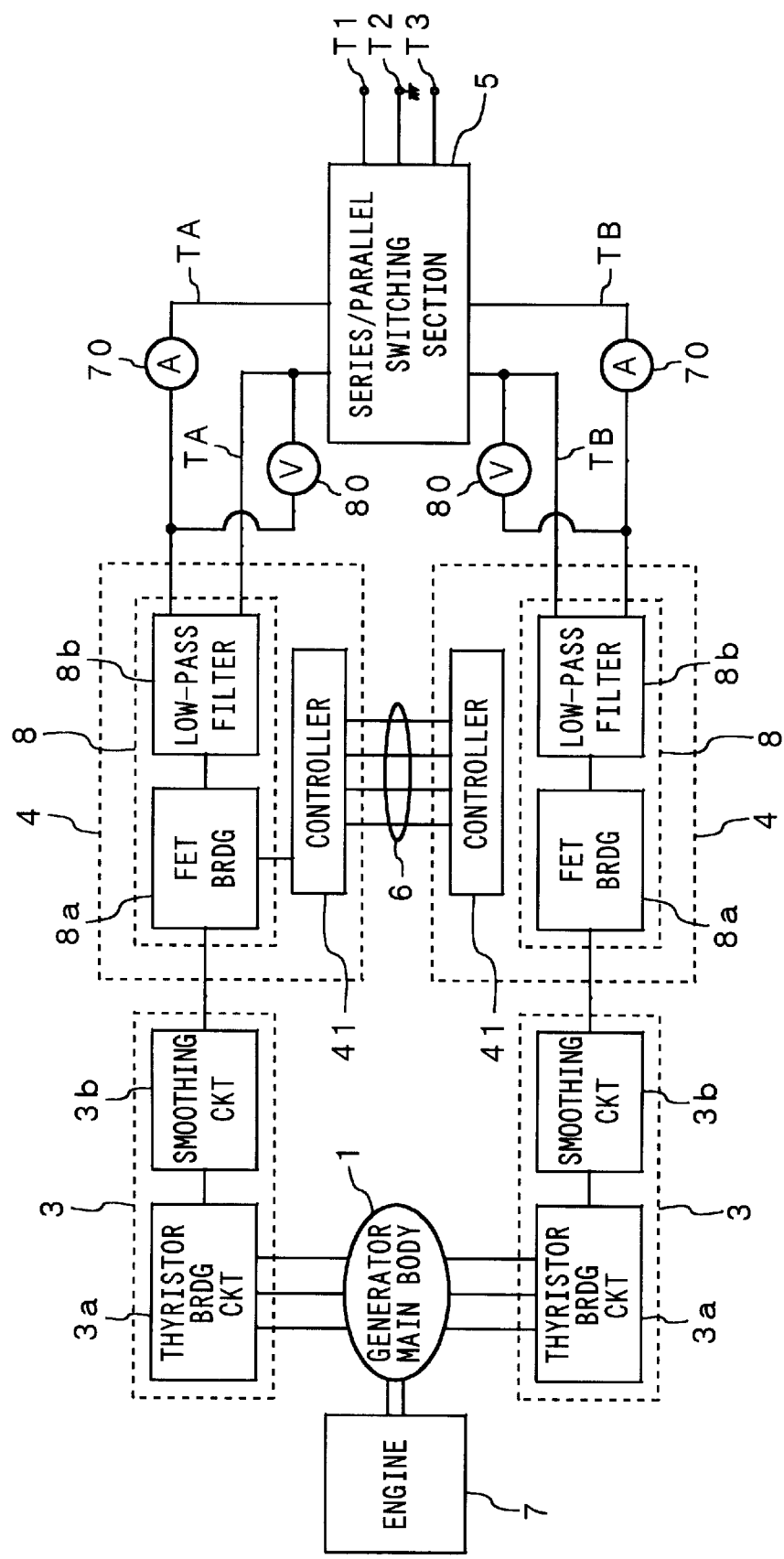
FIG. 2 is a further detailed block diagram showing the generator according to the first embodiment of the invention.

FIG. 2 is a block diagram showing details of the generator shown in FIG. 1, in which identical reference numerals denote identical or equivalent parts of FIG. 1. In FIG. 2, an engine 7 is connected to the generator main body 1 to drive rotors corresponding to the windings 2 and 2.

Each rectification smoothing circuit 3 forms a DC power source or a converter circuit including a thyristor bridge circuit 3a and a smoothing circuit 3b consisting of a capacitor. Each power section 4 has an inverter circuit 8 consisting of a field-effect transistor (FET) bridge 8a and a low-pass filter (LPF) 8b, and the controller 41.

Each thyristor bridge circuit 3a rectifies a high-frequency three-phase AC input from the generator main body 1. A DC voltage obtained by rectification is controlled by a conduction angle of each thyristor in the thyristor bridge circuit 3a. Particularly, when an output voltage of the rectification smoothing circuit 3 is lower than a preset target value, the conduction angle of the thyristor is increased. The smoothing circuit 3b smoothes the pulsating output voltage rectified by the thyristor bridge circuit 3a.

One of the controllers 41 and 41 operates as a master and the other as a slave. The master and slave are determined by setting a communication port in advance. An electronic governor function for controlling the rotation of the engine 7 is provided in the controller 41 as a master.

Each FET bridge 8a pulse-width modulates a DC voltage according to a reference waveform signal from the controller 41. More specifically, four power MOSFETs connected in full bridge are sequentially turned on and off, according to a known method, based on a pulse signal from the controller 41. The output of the FET bridge 8a is an electric power including a sine-wave component.

Each filter circuit 8b is a low-pass filter comprising of a choke coil and a capacitor. A carrier component resulted from the pulse-width modulation is removed by the filter circuit 8b, and a sinusoidal wave voltage of 50 Hz or 60 Hz, for example, is output.

Figure 3:
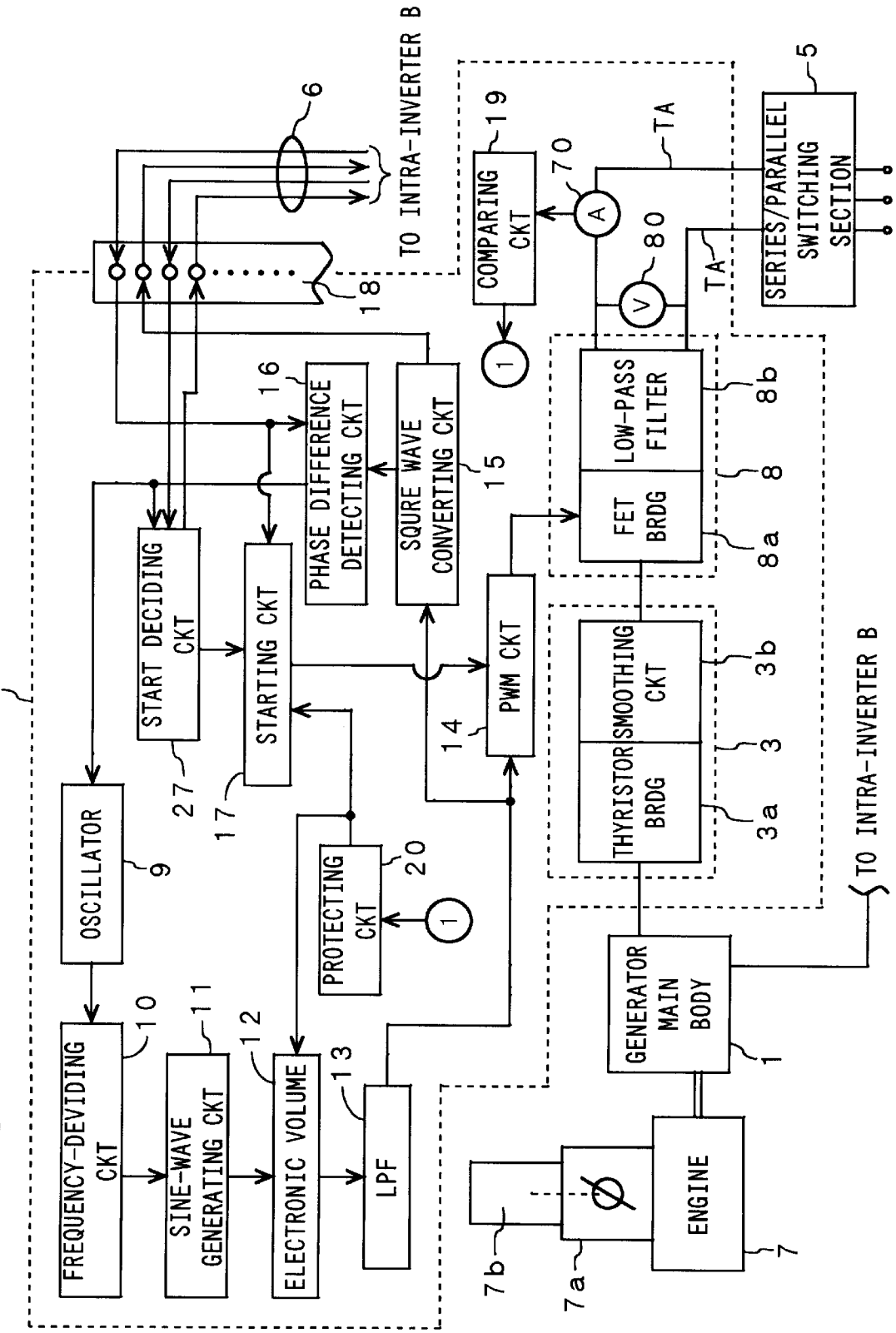
FIG. 3 is a block diagram showing functions of main parts of a controller of the generator according to the first embodiment of the invention.

The controllers 41 and 41 will now be explained in detail. FIG. 3 is a block diagram showing a main parts of the controller, in which reference numerals identical with those in FIG. 2 denote identical or equivalent parts. The controllers 41 and 41 have mutually the same functions except for a part, and therefore, a structure of one of the controllers 41 and 41 will be explained below. However, as the function of the controllers 41 and 41 are mutually relevant, such relevant functions will be explained, of course.

In FIG. 3, the output of the engine 7 is controlled by opening degree of the throttle 7a, and the opening degree of the throttle 7a is set by the stepping motor 7b which is controlled by the electronic governor.

The electronic governor controls the thyristor conduction angle of the thyristor circuit 3a so that the output voltage of the thyristor circuit 3a coincides with a target value. On the other hand, the electronic governor controls the engine rotational speed by adjusting the opening angle of the throttle 2a so that the conduction angle does not deviate from a preset range. For the electronic governor, it is possible to use one disclosed in the co-pending U.S. patent application (No. 09/281,325 filed on Mar. 30, 1999) or another one to be described later with reference to FIG. 9.

In the controller 41, there are provided target or reference waveform generating means consisting of an oscillator 9, a frequency-dividing circuit 10, a sine-wave generating circuit 11, an electronic volume (or an amplitude controller) 12, a low-pass filter (LPF) 13 and a pulse width modulating circuit (PWM circuit) 14, a square wave converting circuit 15, a phase difference detecting circuit 16 and a starting circuit 17. For these circuits, it is possible to use ones as disclosed in Japanese Patent Application Laid-Open No. 5-244726.

The oscillator 9 has a crystal oscillator oscillating at the frequency of 5 MHz, for example. The output of the oscillator 9 is divided by the frequency-dividing circuit 10 and then input to the sine-wave generating circuit 11 as a clock signal. The sine-wave generating circuit 11 generates a step-like sine-wave signal based on the clock signal. The sine-wave signal is shaped into a reference sine-wave signal then through the electronic volume 12 and the LPF 13. The PWM circuit 14 issues a pulse that has been pulse-width modulated based on the reference sine-wave signal as a target waveform signal.

The electronic volume 12 controls the attenuation of the step-like sine-wave signal in the case of an overload, as described later, and the LPF 13 smoothes the step-like sine wave output from the electronic volume 12. In accordance with a pulse output from the PWM circuit 14, the gate of each FET constituting the FET bridge 8a is controlled, and an alternating current is output on the output lines TA and TA according to the sine-wave signal of the reference frequency as a reference waveform signal.

The square wave converting circuit 15 converts an output signal of the LPF 13 into a square wave. The converted signal is input to the communication port 18. The signal input to the communication port 18, that is a reference sine-wave clock, is input to the communication port of the other inverter through the communication lines 6. The phase difference detecting circuit 16 is input with a reference sine-wave clock received from the other inverter (hereinafter, "the intra-inverter B") through the communication port 18 and is also input with a reference sine-wave clock of a self inverter (hereinafter, "the intra-inverter A") from the square wave converting circuit 15.

The phase difference detecting circuit 16 compares the phases of the reference sine-wave clocks of the intra-inverter A and the intra-inverter B to detect an advance or a lag in the phase of the reference sine-wave clock of the inverter B relative to the inverter A, and input an advance or a lag phase signal that represents a result of the detection to the oscillator 9. The oscillator 9 thins out the reference sine-wave clock by a predetermined number of pulses (for example, one pulse) for every constant period (for example, 1 mSec) to slightly increase the frequency in response to the advance phase signal, while inserts a predetermined number of pulses (for example, one pulse) into the reference sine-wave clock train to slightly decrease the frequency in response to the lag phase signal. The frequency adjustment is also carried out in the intra-inverter B in the similar manner. In other words, the outputs of the inverters A and B are mutually adjusted to coincide in phase with each other.

A start deciding circuit 27 outputs a start ready signal for power generation when the rotational speed of the engine 7 and/or the output voltage of the generator 7 have reached predetermined values respectively and additionally the reference sine-wave clocks of the inverters A and B have been synchronized. The completion of the start ready for power generation of the other inverter B is decided based on a signal (which is to be described later) inputted to the intra-inverter A through the communication port 18. Further, the start deciding circuit 27 outputs a preparation completion detection signal to the communication port 18 when the output voltage of the generator 7 and the engine rotational speed detected by an engine rotational speed detecting circuit (not shown) have reached predetermined values respectively.

The starting circuit 17 outputs a starting signal to energize the PWM circuit 14 for driving the inverter circuit 8 which outputs a predetermined alternating current, when it detects a rising (or zero-crossing) of the reference sine-wave clock inputted from the intra-inverter B after the start ready signal is received from the start deciding circuit 27. In other words, after the preparation for power generation of the both inverter A and B has been completed, the starting circuit 17 outputs a starting signal to the PWM circuit 14 in response to the rising (or zero-crossing) of the reference sine-wave clock.

A comparing circuit 19 outputs an over-current signal when a current detected by the current detecting circuit 70 is larger than a threshold value. The over-current signal is input to a protecting circuit 20. The protecting circuit 20 has a timer for outputting an overload signal to the starting circuit 17 when the over-current signal from the comparing circuit 19 has continued for a predetermined period. The electronic volume or amplitude controller 12 attenuates the amplitude of the sine-wave signal in response to the overload signal.

Figure 4:
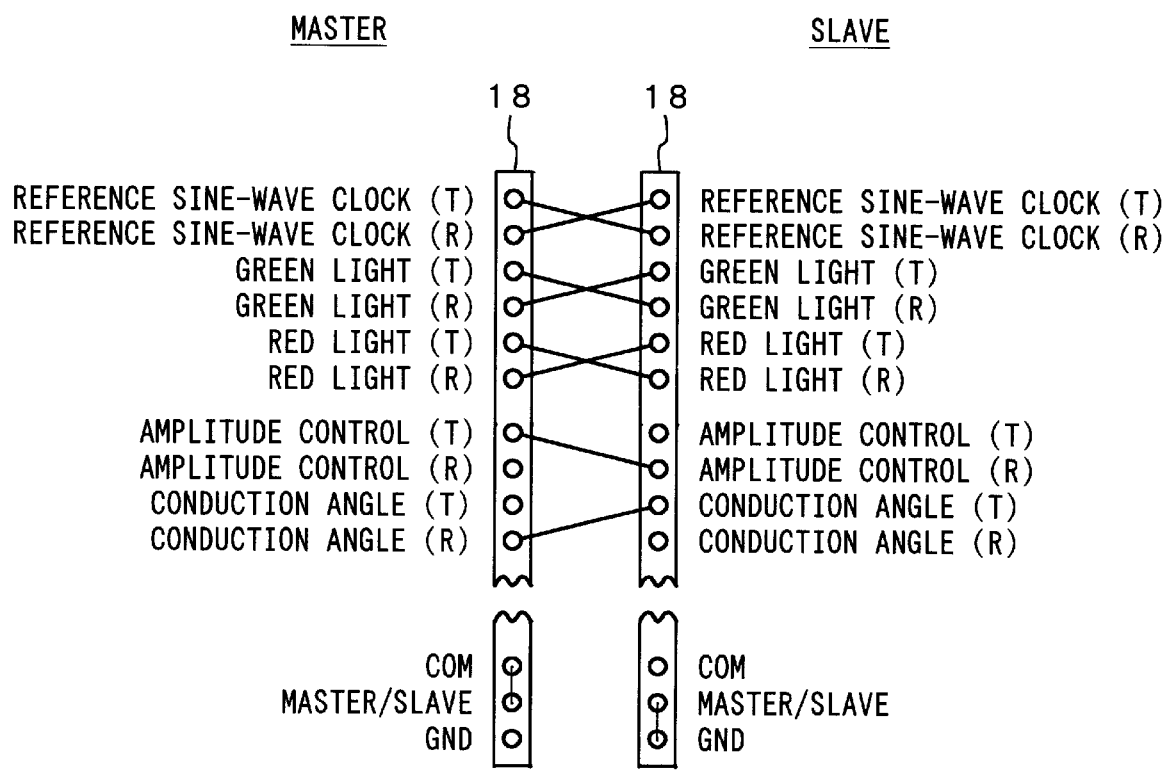
FIG. 4 is a view showing an example of a structure of a communication port.

FIG. 4 is a view showing a relationship between the communication ports 18, 18 of two inverters A and B, in which each of the communication ports 18 and 18 has a reference sine-wave clock transmission (T) port, a reference sine-wave clock receiving (R) port, a light transmission port for a green light emission diode (LED), light receiving port for a green LED, a light transmission port for a red LED, a light receiving port for a red LED, a master/slave setting port, a common (COM) port, a ground (GRN) port, an amplitude control transmission port, an amplitude control receiving port, a conduction angle transmission port, and a conduction angle receiving port. In the case, it is assumed that the intra-inverter A is set as a master, and the intra-inverter B as a slave. These ports are connected with the communication lines 6 as described above.

The green and red LED ports are for communicating the operating status of one of the intra-inverters A and B to the other, respectively, with the light emission of the green LED and the red LED. When the inverter A or B is not ready for power generation, the green and red LEDs are extinguished in the corresponding side, while when the inverter A or B is ready for power generation or generates power, the green LED in the corresponding side is lighted. When an overload has been detected, the red LED is lighted.

When both intra-inverters A and B have been ready for power generation, the start deciding circuit 27 informs the completion of the preparation for power generation to the starting circuit 17, and, at the same time, lights the green LED and maintains the lighting. In other words, when the AND-logic of the two green LED's lighting in both sides is established, the preparation for power generation is completed. When an overload has been detected in any one of the inverters A and B during a power generation, a stop command is outputted to the PWM circuit 14 from the starting circuit 17. In other words, when the OR-logic of the two red LEDs is established, the power generation is stopped.

Figure 5:
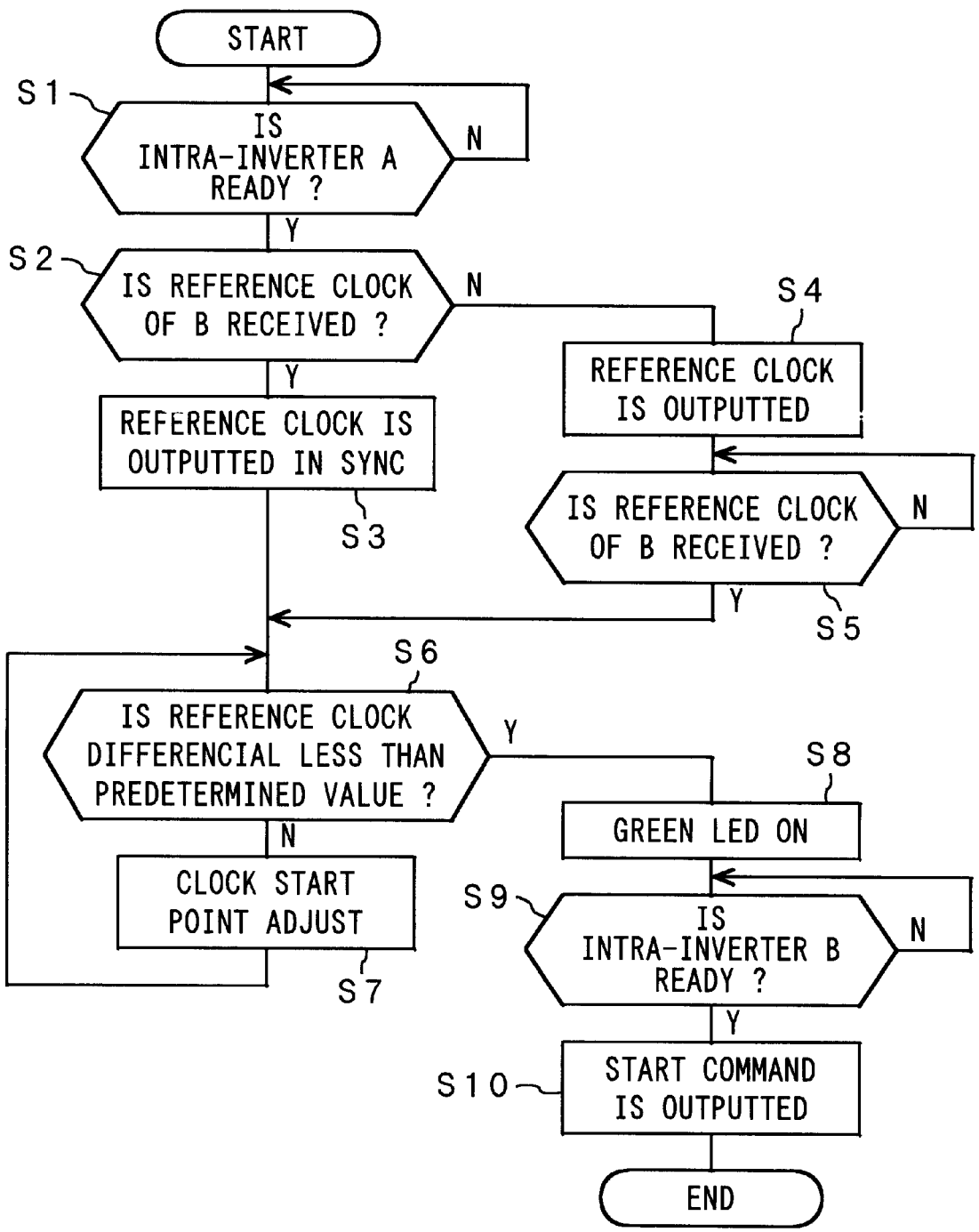
FIG. 5 is a flowchart showing a starting control of an inverter circuit.

The power generation starting operation of the generator will be explained with reference to a flowchart in FIG. 5. Referring to FIG. 5, at step S1, a decision is made as to whether the preparation for power generation is completed or not depending on whether the rotational speed of the engine and/or power source voltage have exceeded predetermined values respectively. If the decision is affirmative, the process proceeds to step S2, and a decision is made as to whether a reference sine-wave clock is received from the intra-inverter B or not. If the decision is affirmative, the process proceeds to step S3, and the reference sine-wave clock of the own device (intra-inverter A) is outputted in synchronism with a zero-cross point (starting point) of the reference sine-wave clock of the intra-inverter B, and then the process proceeds to step S6. When, on the other hand, the reference sine-wave clock is not received from the inverter B, the process proceeds to step S4, and the reference sine-wave clock is started to be outputted. At step S5, a decision is made as to whether the reference sine-wave clock is received from the inverter B or not. If the decision is affirmative, the process proceeds to step S6.

At step S6, a decision is made as to whether the phase difference between the reference sine-wave clocks of the intra-inverter A and B is less than a predetermined value or not. If the decision is negative, the process proceeds to step S7, and the frequency or phase of the reference sine-wave clock is finely adjusted to correct the starting point thereof. When the phase difference has become less than the predetermined value by the correction of the starting point, the process proceeds to step S8, and the green LED is lighted to display the preparation completion for power generation. At step S9, a decision is made about the status of the green LED light from the intra-inverter B to decide whether the inverter B is also ready for power generation or not. If the decision at the step S9 is affirmative, the process proceeds to step S10, and a start command is outputted to the PWM circuit 14 in synchronism with a zero-cross point (starting point) of the reference sine-wave clock.

Figure 6:
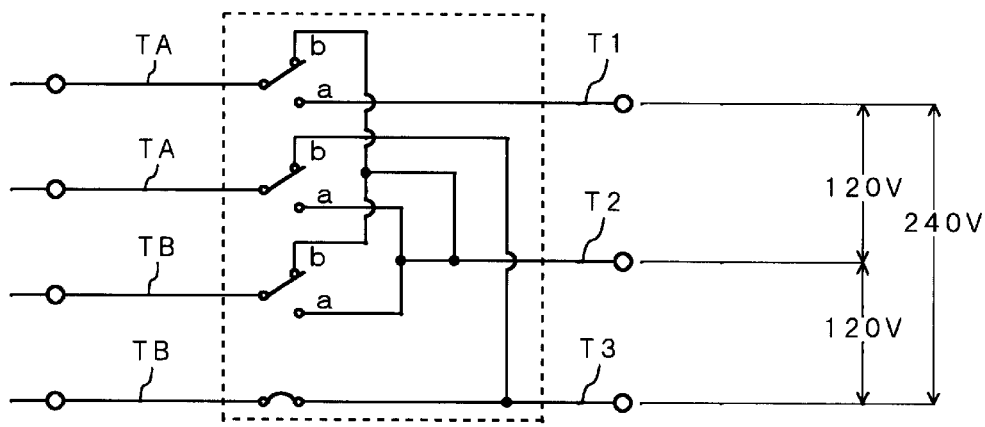
FIG. 6 is a diagram showing an example of a series/parallel switching section.

The series/parallel switching of the two power generation sections will be explained. FIG. 6 is a circuit diagram showing a detail of the series/parallel switching section 5. In FIG. 6, the series/parallel switching section 5 may be structured by a toggle switch. While the switch is changed over to one contact "a", the output voltage (for example, 120 V) of the inverter A is outputted across the output lines Ti and T2, and the output voltage (for example, 120 V) of the inverter B across the output lines T2 and T3. As a result, the output voltage (240 V) that is two times the output voltage of each inverter A and B is obtained across the output lines T1 and T3. In other words, the output voltages of the inverter A and B are connected in series.

While the switch is changed over to the other contact "b", there is no voltage across the output lines T1 and T2, and the output voltages (for example, 120 V) of both inverters A and B are outputted only on the output lines T2 and T3. As a result, both output voltages (120 V) of the inverter A and B are outputted across the output lines T2 and T3 without any changes, and the output power for example, each of 2 kW) appears in two times (4 kW). In other words, both inverter A and B are connected in parallel.

There will be explained below a second embodiment of the present invention in which a generator apparatus is structured by connecting in parallel two generators each including two inverters (dual voltage inverters) structured in a similar manner to the first embodiment. When two generators each including dual inverters are connected in parallel, the phase of the output current and the output voltage of each inverters are deviated from a desired relationship according to a power factor, when the output voltages are not synchronized between the two generators. Thus, the deviation is detected in each inverter, and the phases are controlled so as to be in a desired relationship.

Specifically, based on the phases of currents and/or the voltages appearing on the output lines of the intra-inverters A and B in the intra-generator and a generator combined with the intra-generator (hereinafter, "paired generator"), a decision is made as to whether each of the intra-generator and the paired generator advances to or lagges behind the other generator in phase, respectively. The lagged or delayed phase and the advanced phase are communicated between the intra-inverters A and B within the respective generators by using the communication lines, and the phases are adjusted by fine adjustment of the frequencies.

Figure 7:
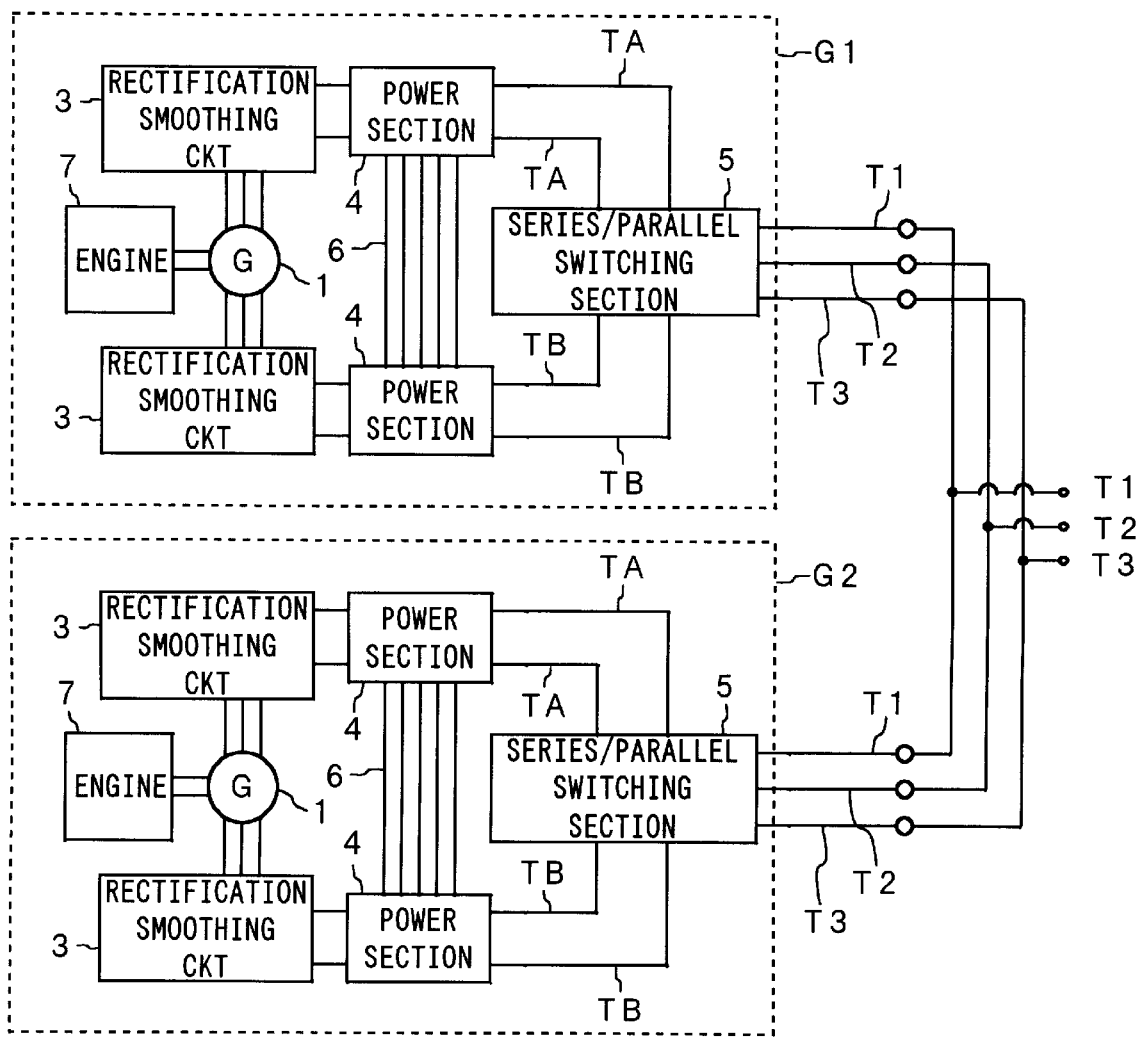
FIG. 7 is a block diagram showing a generator apparatus according to a second embodiment of the invention formed by connecting two generators.

FIG. 7 is a block diagram showing a schematic structure of the generators in the second embodiment. Generators G1 and G2 respectively have two series inverters, and each generator is structured in a similar manner to the generator of the first embodiment. The generators G1 and G2 are connected in parallel with each other through output lines T1 to T3 of a series/parallel switching section 5. A power section 4 each including the intra-inverter is connected with communication lines 6 inside the generators G1 and G2, respectively. The inverters of each generator may be structured in a similar manner to that of the first embodiment, except for parts which functions are explained below.

Figure 8:
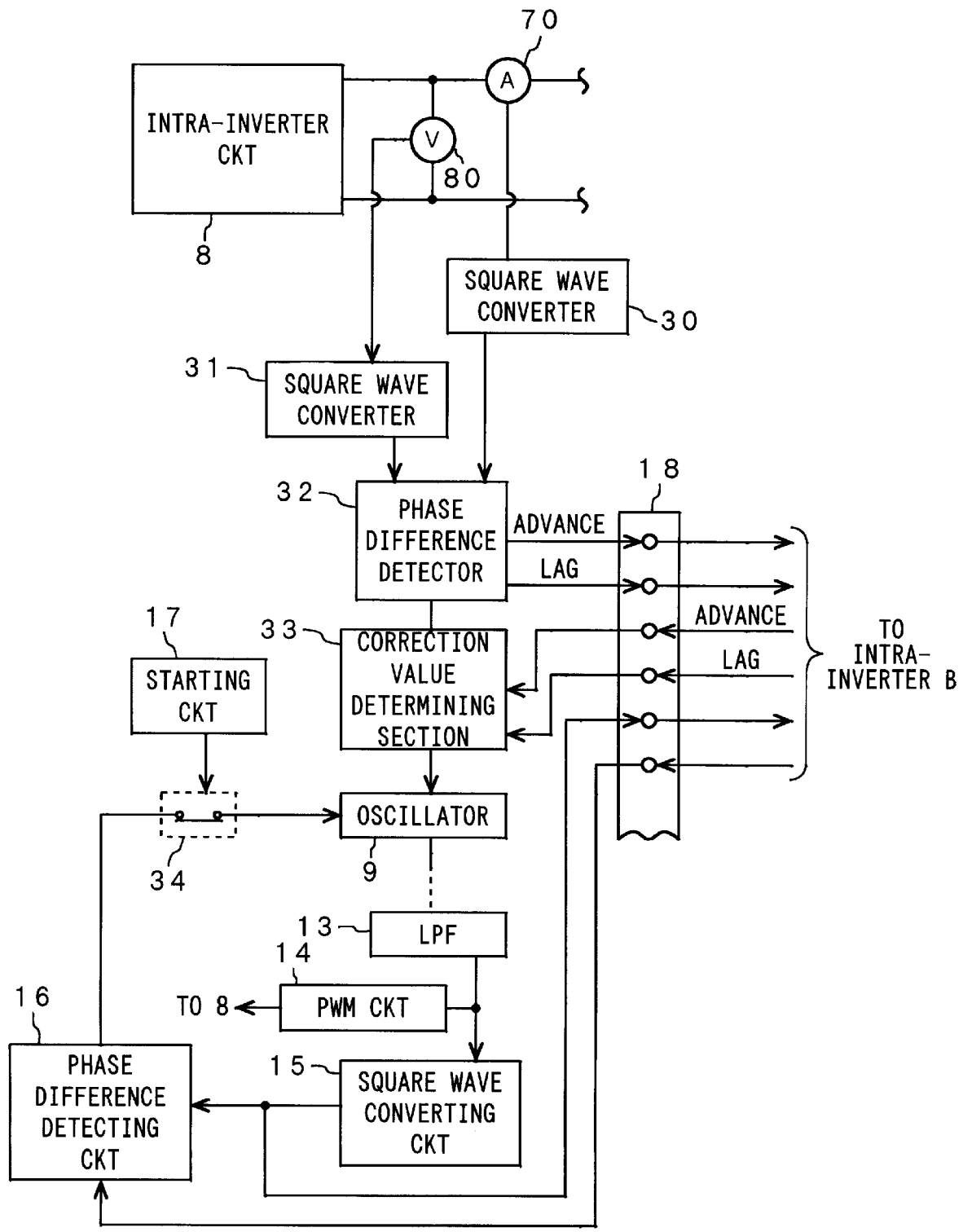
FIG. 8 is a block diagram showing main parts of one of two generators shown in FIG. 7.

FIG. 8 is a block diagram showing main functional parts of each inverter included in the generators of the second embodiment, and the drawing relates to the intra-inverter A of the generator G1. The intra-inverter B and the generator G2 (including other inverters A and B) are also structured in a similar manner. In this case, a phase difference detecting circuit 16 for detecting a phase difference of the reference sine-wave clocks between the intra-inverters A and B is used for only correcting the starting point at the time of starting the intra-inverters A and B. This is because, in the second embodiment, the phase correction is carried out based on an advance phase signal and a lag phase signal communicated between the intra-inverters A and B after the power generation has been started. Accordingly, after outputting a starting command to the PWM circuit 14, a starting circuit 17 inputs to a disconnecting section 34 a signal for prohibiting an input of an output from the phase difference detecting circuit 16 to the oscillator 9. A current detector 70 and a voltage detector 80 measure an output current and an output voltage of the intra-inverter circuit 8 respectively, and supply a measured result to a square wave converters 30 and 31, respectively. A current waveform and a voltage waveform converted into square waves by the square wave converters 30 and 31 are inputted to a phase difference detector 32, respectively, and the phase difference is detected by the detector.

When two generators G1 and G2 are not synchronized, phase differences appear between the current waveform and the voltage waveform. The phase difference detector 32 detects these phase differences, and outputs a phase advance signal or a phase delay or lagging signal depending on whether the phase difference is advanced or lagged. The advance phase signal and the lag phase signal are transmitted to the intra-inverter B through a communication port 18, and are also inputted to a correction value determining section 33. In the intra-inverter B, a advance phase signal or a lag phase signal is also outputted based on a phase difference in a similar manner to those in the intra-inverter A, and is also inputted to the correction value determining section 33 of the intra-inverter A through the communication port 18.

The correction value determining section 33 determines a degree of a fine increase or a fine decrease for adjusting the output frequency of the intra-inverter A based on the advance phase signals and the lag phase signals in the intra-inverters A and B. In other words, when only the intra-inverter A is not synchronized with the voltage of the paired generator, the reference sine-wave clock is adjusted by only one pulse, for example. When none of the intra-inverters A and B are not synchronized with the paired generator, and the two phases are deviated in the same direction, it is preferable to promptly synchronize the phases. Thus, the reference sine-wave clock is adjusted by a larger number of pulses, for example, three pulses, than when only the intra-inverter A is not synchronized with the other generator. On the other hand, when the directions in which the phases of the intra-inverters A and B are respectively deviated from those of the other generator are different from each other, the reference sine-wave clock is not adjusted. In other words, the correction value is set as "0" in that case. Specifically, the correction value is expressed in the pulse width of a signal.

When a correction value of the reference sine-wave clock is determined by the correction value determining section 33, the correction value is inputted to the oscillator 9. The oscillator 9 increases or decreases the oscillation frequency to be outputted, according to the input correction value.

As explained above, in the second embodiment, two generators each having two series inverters (dual voltage inverters) are connected in parallel so as to obtain a large output. In each generator, the intra-inverters can be optionally connected in series or in parallel so that it is possible to obtain two levels of outputs.

A generator having two inverters connected in parallel in which one inverter detects a phase difference of an output voltage relating to the other inverter based on phase differences between the output voltage and current of the one inverter and adjusts or changes the output frequency thereby to cancel the phase difference or to accommodate the phase difference within a predetermined range, is disclosed, in further detail, in the prior patent application (Japanese Patent Application Laid-Open No. 5-244726) by the present applicant.

Figure 9:
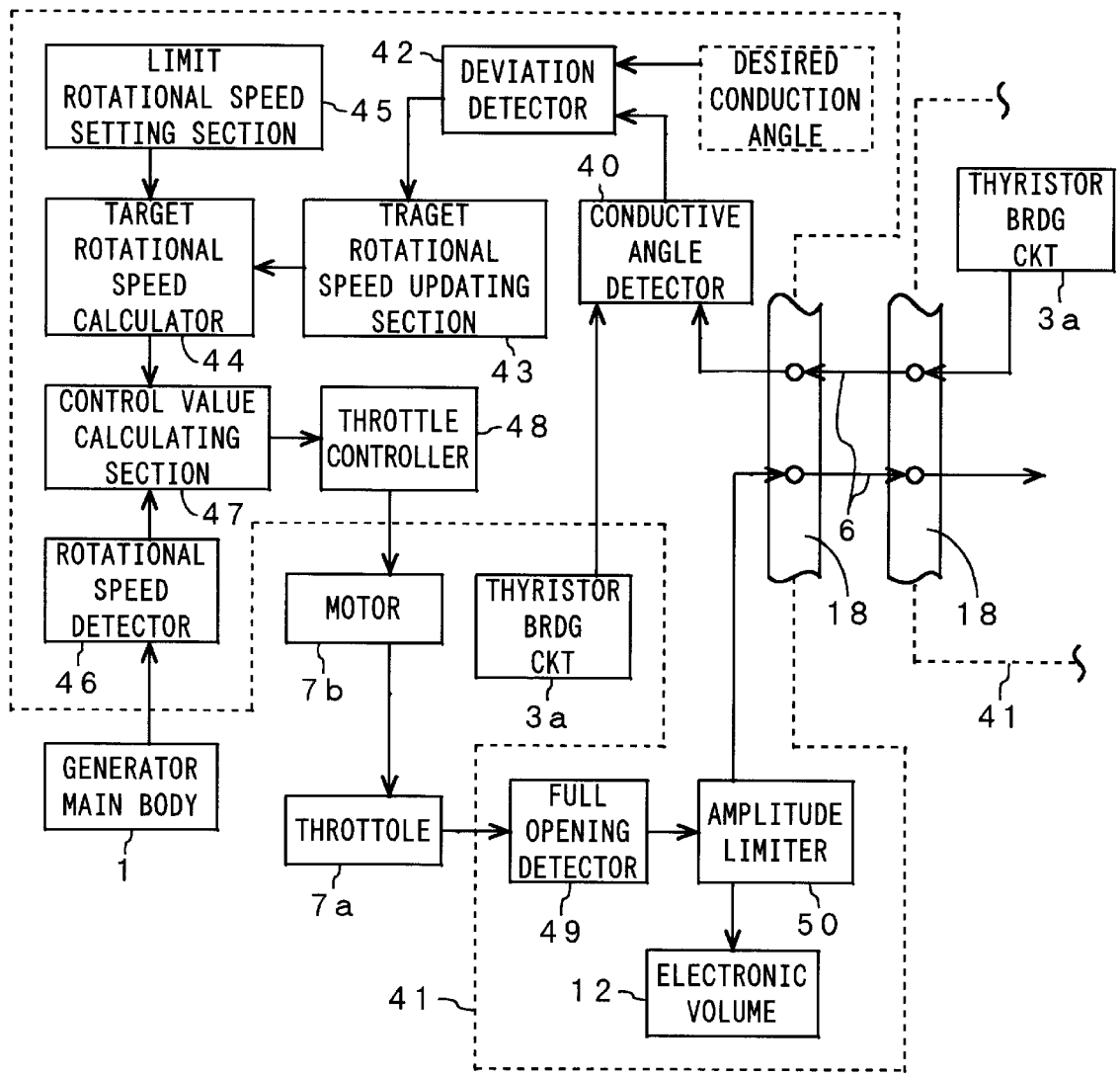
FIG. 9 is a block diagram showing an electronic governor of a generator according to the first embodiment of the invention.

The electronic governor, that is the output control function of the engine, will be explained now. The electronic governor is achieved as a function of the controller 41 of the power section 4 at the side assigned as a master. FIG. 9 is a block diagram showing the function of the electronic governor. In a thyristor bridge circuit 3a, a conduction angle of a thyristor is controlled by thyristor driving means (not shown) so that the output voltage of the rectification smoothing circuit 3 becomes a desired output voltage. To the conduction angle detector 40, there are input conduction angles of the thyristor bridge circuits 3a of the rectification smoothing circuits 3 in both of the intra-inverters A and B. The conduction angle of the thyristor bridge circuit 3a in the slave side is communicated to a controller 41 in the master side through communication lines 6, and is inputted to a conduction angle detector 40. The conduction angle is detected by with a predetermined period, and an average of the angles detected is calculated. It is preferable that the average of the conduction angles is a moving average of predetermined number (for example, ten) of continuous data. The conduction angle detector 40 decides a load factor depending on the conduction angle. The conduction angle detector 40 compares the conduction angles of the master and the slave to output a larger one as a detected conduction angle. Thus, the engine output is controlled to match a heavier load factor of the power sections 4 and 4.

A conduction angle detected by the conduction angle detector 40 is inputted to a deviation detector 42 to detect a deviation from a target conduction angle. In other words, a decision is made as to whether a generator is being operated in a status with a margin in the output or not. For example, a target conduction angle is set at 80%. It is desirable that the target conduction angle has a certain hysteresis like a general control target value. The target conduction angle may be a fixed value, or may be variable according to the temperature of the engine 7 or others. For example, when the temperature of the engine 7 is low, the target conduction angle is set at a smaller value than when the temperature of the engine 7 is high. In the way, the rotational speed of the engine 7 is controlled so that the deviation detected by the deviation detector 42 becomes "0", and a status that there is the margin in the generator is maintained.

A target rotational speed updating section 43 outputs a rotational speed adjusting value, and may be structured by a table storing a rotational speed adjusting value in accordance with the deviation. When the deviation is inputted to the target rotational speed updating section 43, this section inputs a rotational speed adjusting value according to the input, to a target rotational speed calculator 44. The target rotational speed calculator 44 adds the rotational speed adjusting value inputted from the target rotational speed updating section 43 to a target rotational speed already stored, thereby to obtain a new target rotational speed.

The target rotational speed updated is limited within the range of a maximum rotational speed and a minimum rotational speed set in a limit rotational speed setting section 45. When the target rotational speed is out of said range, the target rotational speed is limited to a maximum or a minimum rotational speed. The minimum rotational speed is prescribed for avoiding the loss of stability due to a no-load or a light load when the conduction angle of the thyristor responses to a slight change in the rotational speed.

The rotational speed detector 46 detects a rotational speed of the generator main body 1. A control value calculating section 47 calculates a control value for making the deviation of an actual rotational speed from a target rotational speed "zero", based on the actual rotational speed input from the rotational speed detector 46 and the target rotational speed read from the target rotational speed calculator 44, according to a known convenient method such as, for example, by proportion, integration or differentiation operation. A throttle controller 48 supplies pulses of the number corresponding to the result of the calculation by the control value calculating section 47, to a stepping motor 7b. The stepping motor 7b rotates according to the number of the pulses supplied, and changes the opening degree of a throttle 7a.

When the throttle 7a is fully opened and there is no margin in the output of the engine, the engine will stop. Therefore, in order to prevent the phenomenon, it is preferable that the amplitude of the FET bridge 8a is limited when the throttle is fully opened. In order to limit the amplitude, there is provided a full opening detector 49 for monitoring the opening degree of the throttle 7a. The full opening detector 49 outputs a detection signal to an amplitude limiter 50 when the throttle is fully opened. The amplitude limiter 50 transmits a control signal to an electronic volume 12. The electronic volume 12 controls the amplitude of the FET bridge 8a at a preset limit value for controlling the amplitude, in response to the control signal. Further, the amplitude limiter 50 inputs the limiting signal to a predetermined port of a communication port 18 for limiting the amplitude of the FET bridge 8a of the power section 4 of the intra-inverter B at the slave side. The limiting signal is transmitted to the communication port 18 at the slave side through the communication lines 6, and is then taken by the controller 41 at the slave side.

Figure 10:
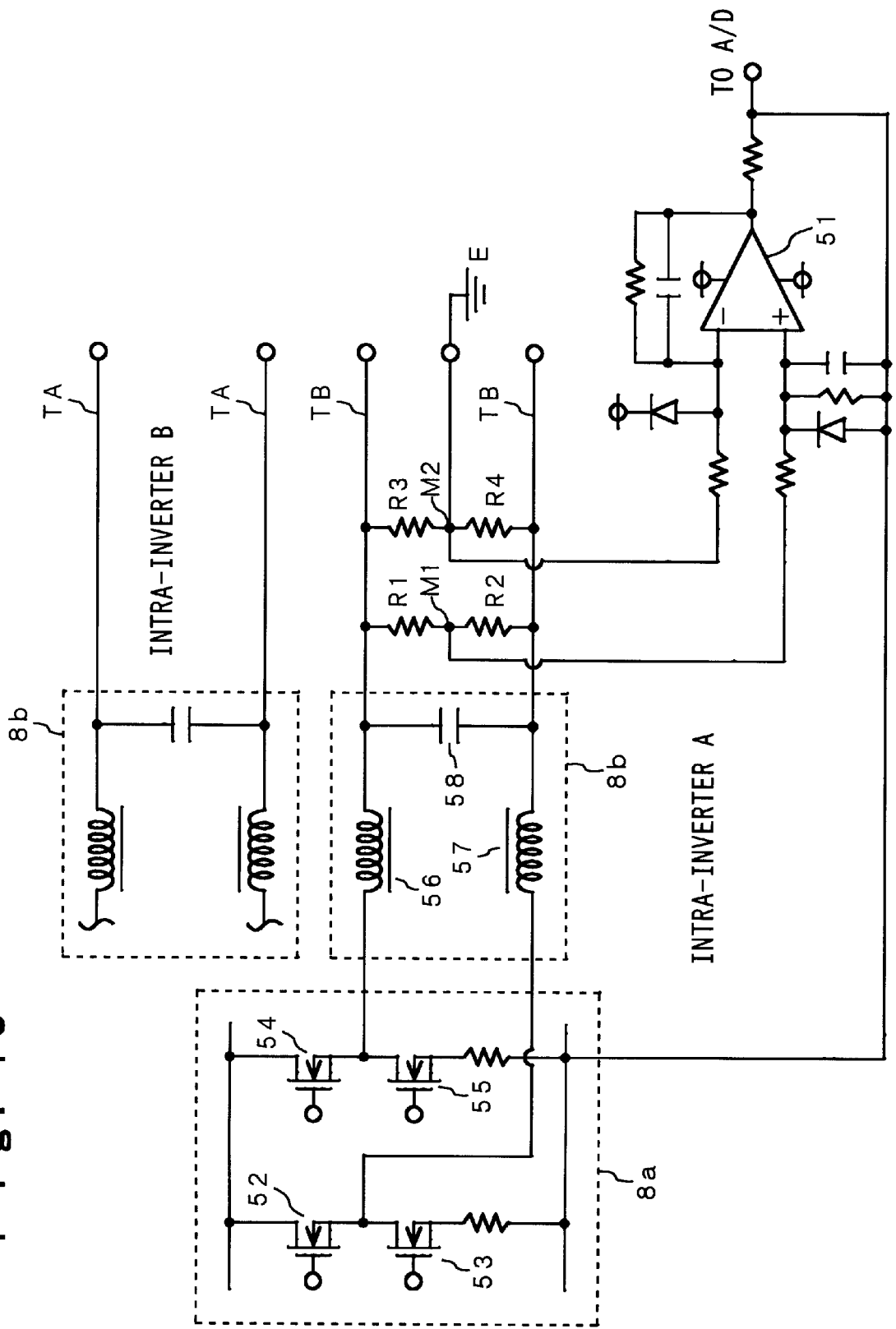
FIG. 10 is a block diagram showing a detector of a ground fault interrupter in the generator according to the first embodiment of the invention.

The ground fault interrupter provided in the above generator will be explained. FIG. 10 is a circuit diagram of a detector in the ground fault interrupter, and reference symbols identical with those in FIG. 2 denote identical or equivalent parts. In FIG. 10, resistors R1, R2, R3 and R4 are connected in a bridge between output terminals TA and TB of an intra-inverter A consisting of a FET bridge 8a and a filter circuit 8b. A node M1 of the resistors R1 and R2 and an another node M2 of the resistors R3 and R4 are connected to a plus and a minus input terminal, respectively, of a differential amplifier 51. Further, the node M2 is connected to an earth terminal E.

In other words, a resistance divided voltage at the node M1 is inputted to the plus input terminal of the differential amplifier 51 as the first resistance divided voltage. Further, a resistance divided voltage at the node M2 of an earth line reference is inputted to the minus input terminal of the differential amplifier 51 as a second resistance divided voltage. It is preferable that the resistance values of the resistors R1 through R4 are substantially equal. An output of the differential amplifier 51 is digitalized by an A/D converter (not shown), and then supplied to a signal discrimination section (to be described later) provided in the controller 41. Resistors, capacitors, diodes and the like connected to the differential amplifier 51 are circuit elements for adjusting properties such as amplification factor and sensitivities of the differential amplifier 51. However, as individual functions of these elements are well known in the arts, explanation of them will be omitted.

The FET bridge 8a is comprised of power MOSFETs 52, 53, 54 and 55, and the filter circuit 8b achieves a filter function by choke coils 56 and 57 and a capacitor 58. A FET bridge (reference FIG. 2) and a filter circuit of the intra-inverter B are structured in a similar manner.

Figure 12A:
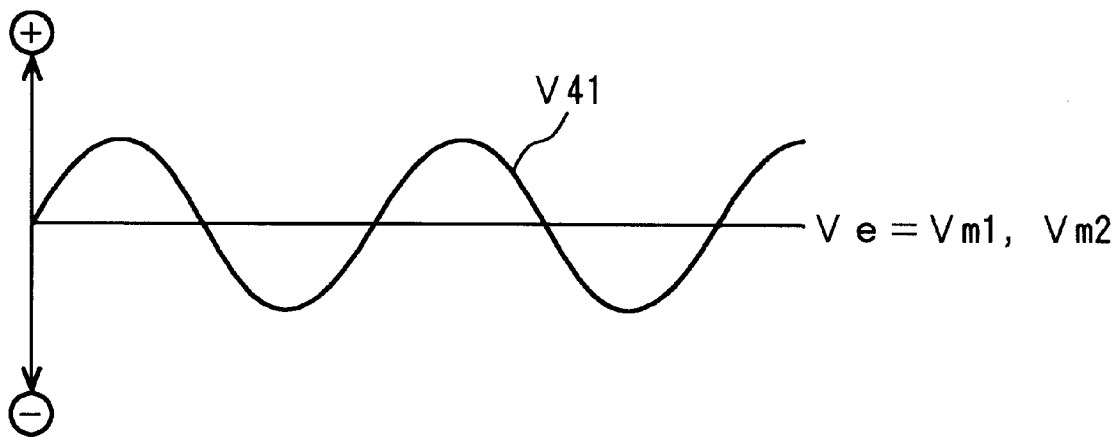
FIGS. 12a and 12b are diagrams showing a voltage waveform at a ground occurrence.

The operation of the ground fault interrupter having the above-described structure will be explained below with reference to FIG. 10 and FIG. 12 that shows waveforms of the output voltage and resistance divided voltage. The differential amplifier 51 outputs a signal corresponding to the voltage difference between the nodes M1 and M2. When there is no leak or ground fault, an output voltage V41 varies as shown in FIG. 12A and a voltage Vm1 at the node M1 is maintained at an earth potential Ve of the generator. As the node M2 is grounded, a voltage Vm2 at the node M2 is also maintained at the earth potential Ve. As there is no difference between these voltages Vm1 and Vm2, the differential amplifier 51 does not generate any outputs.

Figure 12B:
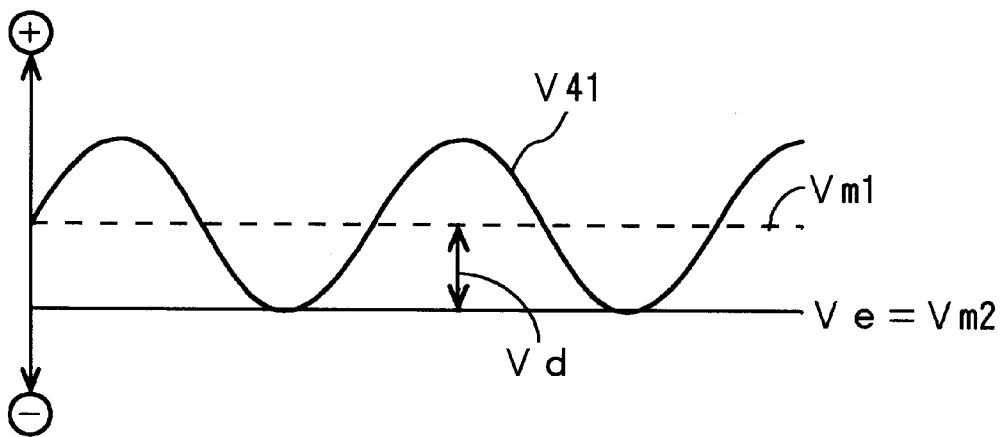
Figure 13:
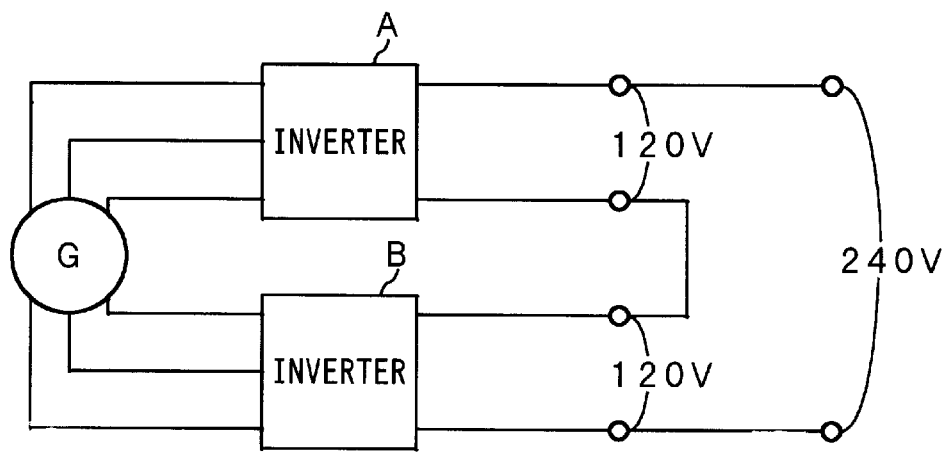
FIG. 13 is a simplified diagram of two series of inverter serially connected.
Figure 14:
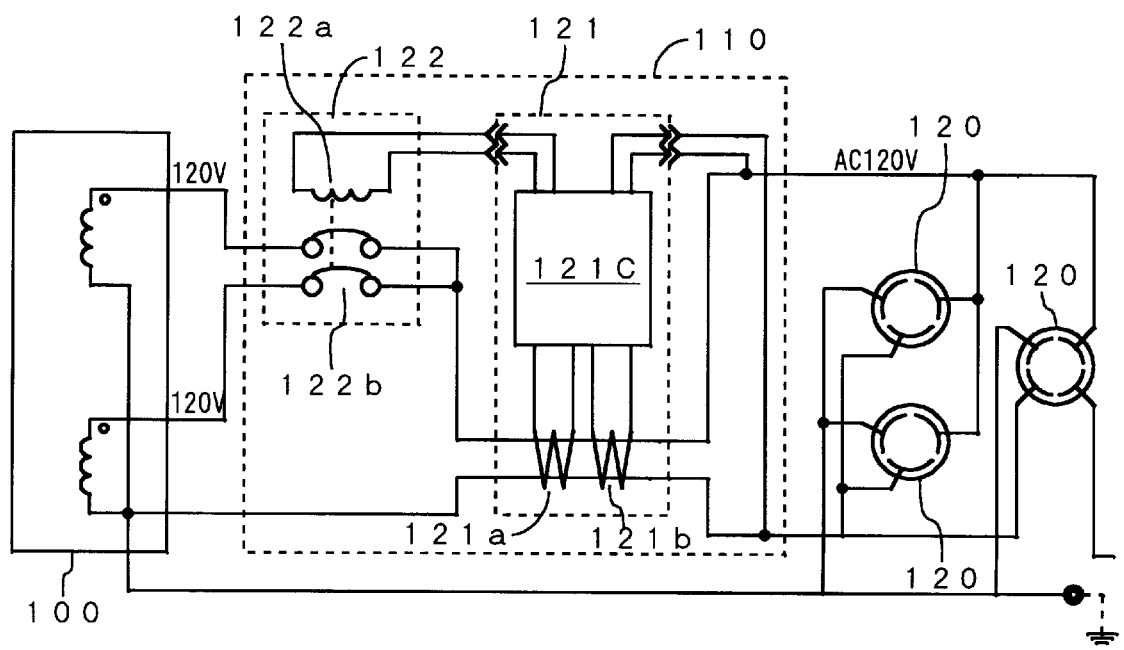
FIG. 14 is a circuit diagram of a generator including a conventional ground fault interrupter.

On the other hand, when there is a ground, a circuit 10 connecting a ground point and the node M2 is formed through an earth terminal E, and the earth point of the generator deviates. Then, the voltage V41 across the output terminals TA and TB deviates to a positive or a negative side according to a ground position and accordingly, the voltage at the node M1 also deviates to a positive or a negative side. FIG. 12B shows the divided voltage waveform when the voltage Vm1 deviate to the positive direction. On the other hand, as the node M2 is originally grounded, the voltage Vm2 is maintained at the earth potential Ve of the generator. As a result, a voltage difference Vd is generated across the nodes M1 and M2, and the differential amplifier 51 outputs a signal of a level corresponding to a leakage current.

Figure 11:
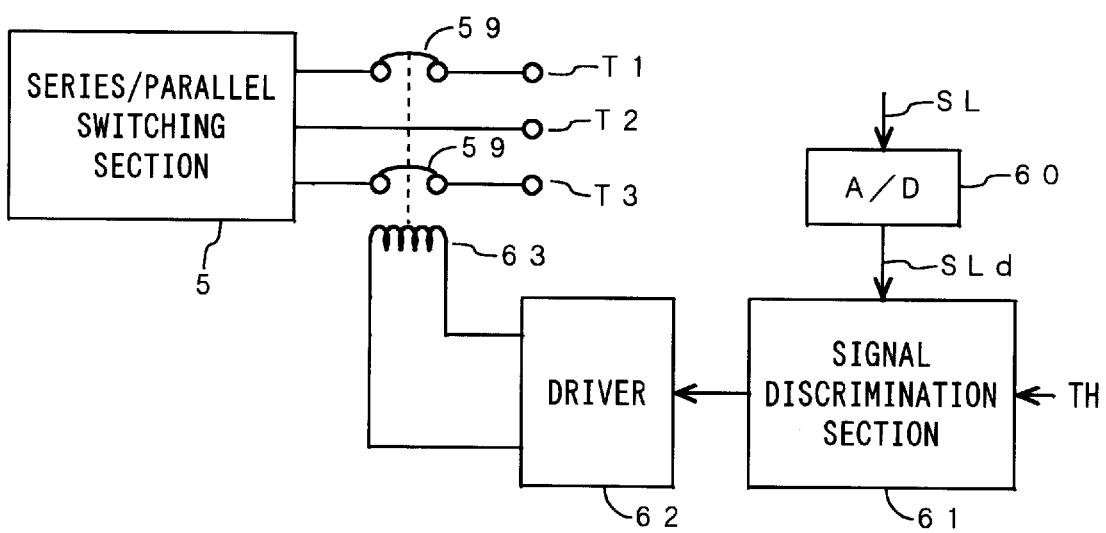
FIG. 11 is a block diagram showing a driving section of the ground fault interrupter.

FIG. 11 is a functional block diagram of a driving section controlled based on a result detected by the detector of the ground fault interrupter. In FIG. 11, contact points 59, 59 are provided at output terminals T1 and T3, respectively. These contact points 59, 59 are closed when there is no ground, that is, when the differential amplifier 51 does not generate an output of a predetermined value or above. A signal SL from the differential amplifier 51 is A/D converted by an A/D converter 60, and a resultant digital signal SLd is inputted to a signal discrimination section 61. The signal discrimination section 61 decides a relative size of the digital signal as compared with a threshold value TH. When the signal SLd is larger than the threshold value TH, the signal discrimination section 61 outputs a fault detection signal to a driver 62. When the fault detection signal is inputted to the driver 62, a relay coil 63 is energized to open the contact point 59 and to interrupt the output.

According to the ground fault interrupter mentioned above, it is possible to detect any ground fault in any one of the two inverter systems, by providing a resistor bridge in any one of the two inverters when the two inverter systems are connected in series or in parallel.

As is clear from the above description, according to the present invention, it is possible to optionally connect the outputs of two inverter systems in series or in parallel, so that an output current or an output voltage can be selected in two levels. Therefore, it is possible to select the output characteristic to meet a usage and/or a destination by merely operating the switching means, with an improved application of the invention for general purposes.

It is also possible to change the adjusting speed of the output frequency of each inverter based on a quantity and/or a direction (advance or lagged) of the phase difference between two inverters of generators, for example. Therefore, it is possible to adjust the synchronization at a suitable speed. It is possible to achieve an eco-throttle control in a generator having two inverter systems.

What is claimed is:

1. A generator having two power source systems each of which comprises a rectifier circuit for rectifying an input alternating current into a direct current and an inverter circuit for converting the direct current inputted from the rectifier circuit into an alternating current of a predetermined frequency, one of said systems further comprising:

target waveform generating means for producing a reference waveform to determine an output frequency of the inverter circuit;

means for producing a reference waveform clock signal representative of the reference a waveform to the other system;

means for receiving a second reference waveform clock signal transmitted from the other system;

phase difference detecting means for detecting a phase difference between the first and second reference waveform clock signals; and frequency adjusting means for adjusting the output frequency so that the phase difference detected by the phase difference detecting means is within a predetermined range;

wherein the generator includes switching means for selectively connects the two power source systems in series connection or in parallel connection.

2. A generator apparatus including two generators recited in claim 1 connected in parallel, wherein one of said two systems incorporated in each of the generators comprises:

current detecting means for detecting an output current of the intra-systems;

voltage detecting means for detecting an output voltage of the intra-systems;

second phase difference detecting means for detecting a second phase difference between the output current and the output voltage; and second frequency adjusting means for adjusting the output frequency so that the second phase difference is within a second predetermined range, and wherein when a phase difference between the reference waveform clock signals is within a predetermined range, the generator starts a power generation by energizing the inverter circuit, and the function of the frequency adjusting means recited in claim 1 is stopped in response to the starting of the power generation.

3. A generator apparatus according to claim 2 further comprising:

means for transmitting the second phase difference to the other system in the same generator;

means for receiving a second phase difference transmitted from the other system; and correcting means for correcting an adjustment quantity issued by the second frequency adjusting means, based on a phase difference between the first and the second phases.

4. A generator comprises an engine for driving a generator main body for generating an alternating current, and two systems of inverter apparatuses each of which consisting of a converter circuit structured with semiconductor rectification elements for converting the alternating current into a direct current by controlling a conduction of the semiconductor rectification elements and an inverter circuit for converting the direct current into an output alternating current of a predetermined frequency, rectification element driving means for controlling a conduction angle of the semiconductor rectification elements so that an output voltage of each converter circuit is equal to a predetermined target voltage value; and engine control means for detecting a conduction angle of the rectification elements in a converter circuit at a master side of the two systems of inverter apparatuses and for controlling a rotational speed of the engine so that the detected conduction angle converges into a predetermined target angle.

5. A generator comprises an engine for driving a generator main body for generating an alternating current, and two systems of inverter apparatuses each of which consisting of a converter circuit structured with semiconductor rectification elements for converting the alternating current into a direct current by controlling a conduction of the semiconductor rectification elements and an inverter circuit for converting the direct current into an output alternating current of a predetermined frequency, rectification element driving means for controlling a conduction angle of the semiconductor rectification elements so that an output voltage of each converter circuit is equal to a predetermined target voltage value;

conduction angle judgement means for making a decision as to which one of conduction angles of two converter circuits of the two inverter apparatuses is larger; and engine control means for controlling a rotational speed of the engine so that the larger conduction angle converges into a predetermined target angle value.

6. A generator according to claim 5, wherein the conduction angle judgement means and the engine control means are fixed as a control means for a master inverter apparatus of the two system of inverter apparatuses, and further comprising a communication port for transmitting a conduction angle of a slave inverter apparatus to the conduction angle judgement means in the master inverter apparatus.

7. A generator having an inverter apparatus consisting of a converter circuit for converting an alternating current into a direct current by controlling a current conduction of semiconductor rectification elements and an inverter circuit for converting the direct current into an output alternating current of a predetermined frequency, said generator comprising:

a resistance bridge provided across output terminals of the inverter apparatus and having one node point of the bridge connected to the earth;

voltage difference detecting means for detecting a voltage difference across said one node and the other node points of the resistance bridge; and discrimination means for outputting a ground fault signal when the voltage difference is equal to or above a threshold value for discrimination of a ground.

8. A generator having an inverter apparatus consisting of a converter circuit for converting an alternating current into a direct current by controlling a current conduction of semiconductor rectification elements and an inverter circuit for converting the direct current into an output alternating current of a predetermined frequency, said generator comprising:

series/parallel switching means for selectively connecting the two inverter systems in series or in parallel connection;

a resistance bridge provided across output terminals of one of the two systems of the inverter apparatuses having one node point of the bridge connected to the earth;

voltage difference detecting means for detecting a voltage difference across said one node and the other node points of the resistance bridge; and discrimination means for outputting a ground fault signal when the voltage difference is equal to or above a threshold value for discrimination of a ground.

* * * * *